(12) United States Patent
Spang et al.

(10) Patent No.: US 11,265,395 B2
(45) Date of Patent: Mar. 1, 2022

(54) DATA PURGE DISTRIBUTION AND COHERENCY

(71) Applicant: Fastly Inc., San Francisco, CA (US)

(72) Inventors: Bruce Spang, San Francisco, CA (US); Tyler B. McMullen, San Francisco, CA (US)

(73) Assignee: Fastly, Inc., San Francisco, CA (US)

( * ) Notice: Subject to any disclaimer, the term of this patent is extended or adjusted under 35 U.S.C. 154(b) by 0 days.

(21) Appl. No.: 16/735,436

(22) Filed: Jan. 6, 2020

(65) Prior Publication Data

US 2020/0145512 A1    May 7, 2020

Related U.S. Application Data

(63) Continuation of application No. 14/225,971, filed on Mar. 26, 2014, now Pat. No. 10,530,883.

(60) Provisional application No. 61/941,317, filed on Feb. 18, 2014.

(51) Int. Cl.
| | |
|---|---|
| H04L 29/08 | (2006.01) |
| H04L 67/568 | (2022.01) |
| H04L 67/5683 | (2022.01) |
| H04L 67/56 | (2022.01) |
| H04L 67/5682 | (2022.01) |

(52) U.S. Cl.
CPC .......... H04L 67/2842 (2013.01); H04L 67/28 (2013.01); H04L 67/2852 (2013.01); H04L 67/2857 (2013.01)

(58) Field of Classification Search
CPC .. H04L 67/104; H04L 67/1057; H04L 63/107
USPC ......................................................... 709/213
See application file for complete search history.

(56) References Cited

U.S. PATENT DOCUMENTS

| | | | | |
|---|---|---|---|---|
| 5,363,496 | A * | 11/1994 | Kato ................... | G06F 12/0891 711/135 |
| 6,345,352 | B1 * | 2/2002 | James ................. | G06F 12/1027 711/207 |
| 6,493,801 | B2 * | 12/2002 | Steely, Jr. ........... | G06F 12/0804 711/133 |
| 6,604,185 | B1 | 8/2003 | Fromm et al. | |
| 6,829,679 | B2 * | 12/2004 | DeSota ............... | G06F 12/0888 711/133 |
| 7,055,003 | B2 * | 5/2006 | Cargnoni .............. | G06F 11/106 711/122 |
| 7,062,515 | B1 * | 6/2006 | Thomas .............. | G06F 12/0804 711/118 |
| 7,096,320 | B2 * | 8/2006 | Gaither ............... | G06F 12/0804 711/133 |
| 7,111,057 | B1 | 9/2006 | Sherman et al. | |
| 7,117,310 | B2 | 10/2006 | Chatterjee et al. | |
| 7,457,828 | B2 * | 11/2008 | Wenner et al. | |
| 7,603,340 | B2 * | 10/2009 | Ngai et al. | |

(Continued)

*Primary Examiner* — Tauqir Hussain

(57) ABSTRACT

Systems, methods, and software for operating a content delivery system to purge cached content are provided herein. In one example, purge messages are transferred for delivery to content delivery nodes (CDNs) in the content delivery system. The CDNs receive the messages, purge content associated with the messages, and compile purge summaries based on the messages. The CDNs further periodically transfer the purge summaries to one another to compare the messages received, and gather purge information for purge messages that may have been inadvertently missed by the CDNs.

12 Claims, 6 Drawing Sheets

(56) References Cited

U.S. PATENT DOCUMENTS

| | | | |
|---|---|---|---|
| 8,095,771 B2* | 1/2012 | Sheu et al. | 711/203 |
| 8,108,612 B2* | 1/2012 | Xun et al. | 711/129 |
| 8,364,899 B2* | 1/2013 | Ambroladze et al. | 711/135 |
| 8,447,801 B1* | 5/2013 | Roche | H04L 67/306 709/201 |
| 8,458,340 B2* | 6/2013 | Erickson | 709/227 |
| 8,983,978 B2* | 3/2015 | Priyadarshan et al. | 707/751 |
| 8,984,268 B2* | 3/2015 | VanHeyningen | 713/150 |
| 9,002,990 B1* | 4/2015 | Anand et al. | 709/219 |
| 9,124,670 B2 | 9/2015 | Neel et al. | |
| 2002/0069329 A1 | 6/2002 | James et al. | |
| 2003/0079085 A1* | 4/2003 | Ang | G06F 12/0817 711/122 |
| 2003/0129991 A1* | 7/2003 | Allison | H04Q 3/0025 455/456.1 |
| 2004/0128435 A1* | 7/2004 | Regev | G06F 16/90339 711/108 |
| 2008/0253564 A1 | 10/2008 | Kahn et al. | |
| 2009/0271497 A1* | 10/2009 | Roberts | 709/218 |
| 2010/0034143 A1* | 2/2010 | Cordeiro et al. | 370/328 |
| 2011/0197032 A1* | 8/2011 | Patey | G06F 16/24552 711/133 |
| 2012/0209942 A1* | 8/2012 | Zehavi et al. | 709/213 |
| 2013/0007228 A1* | 1/2013 | Sherman | H04L 63/14 709/219 |
| 2013/0066955 A1* | 3/2013 | Neel et al. | 709/203 |
| 2013/0227051 A1* | 8/2013 | Khakpour et al. | 709/213 |
| 2014/0013053 A1* | 1/2014 | Sawin et al. | 711/122 |
| 2014/0281131 A1* | 9/2014 | Joshi et al. | 711/103 |
| 2015/0006666 A1* | 1/2015 | Backholm et al. | 709/213 |
| 2015/0088964 A1* | 3/2015 | Shiell et al. | 709/203 |
| 2015/0178299 A1 | 6/2015 | Kazerani et al. | |
| 2017/0235848 A1* | 8/2017 | Van Dusen | G06F 30/20 705/12 |

* cited by examiner

| PURGE SUMMARY TABLE 600 ||
|---|---|
| PURGE SUMM. 610 | PURGE DETAILS 620 |
| 1 | ALPHA |
| 2 | BETA |
| 3 | THETA |
| ⋮ | ⋮ |
| n | DELTA |

| PURGE SUMMARY TABLE 601 ||
|---|---|
| PURGE SUMM. 611 | PURGE DETAILS 621 |
| 1 | ALPHA |
| 3 | THETA |
| ⋮ | ⋮ |
| n | DELTA |

DATA PURGE DISTRIBUTION AND COHERENCY

RELATED APPLICATION

This application is a continuation of and claims priority to U.S. patent application Ser. No. 14/225,971, granted on Jan. 7, 2020 as U.S. Pat. No. 10,530,883, and entitled DATA PURGE DISTRIBUTION AND COHERENCY, which itself claims the benefit of and priority to U.S. Provisional Patent Application 61/941,317, titled "DATA PURGE DISTRIBUTION AND COHERENCY," filed Feb. 18, 2014, both of which are hereby incorporated by reference in their entirety.

TECHNICAL FIELD

Aspects of the disclosure are related to the field of data storage systems, and in particular, handling of cached content in content delivery nodes of a content delivery system.

TECHNICAL BACKGROUND

Network-provided content, such as Internet web pages or media content such as video, pictures, music, and the like, are typically served to end users via networked computer systems. End user requests for the network content are processed and the content is responsively provided over various network links. These networked computer systems can include origin hosting servers which originally host network content of content creators or originators, such as web servers for hosting a news website. However, these computer systems of individual content originators can become overloaded and slow due to frequent requests of content by end users.

Content delivery systems have been developed which add a layer of caching between the origin servers of the content providers and the end users. The content delivery systems typically have one or more content delivery nodes distributed across a large geographic region to provide faster and lower latency access to the content for the end users. When end users request content, such as a web page, which is handled through a content delivery node, the content delivery node is configured to respond to the end user requests instead of the origin servers. In this manner, a content delivery node can act as a proxy for the origin servers.

Content of the origin servers can be cached into the content delivery nodes, and can be requested via the content delivery nodes from the origin servers for the cached content. Content delivery nodes usually cache only a portion of the original source content rather than caching all content or data associated with an original content source. Accordingly, content delivery nodes may be required to purge and update content based on the requests by end user devices. Further, administrators or other management services may wish update or remove content from all of the content delivery nodes at once, requiring a mass purge by all content delivery nodes within a system.

OVERVIEW

Systems, methods, and software are included herein to purge content from content delivery nodes. In one example, a method of operating a content delivery system comprising content delivery nodes includes, responsive to requests to purge content cached by the content delivery system, transferring purge messages for delivery to each of the content delivery nodes. The method further includes, in the content delivery nodes, if the purge messages are received, purging content associated with the purge messages and compiling purge summaries which indicate the purge messages that are received. The method also provides, in the content delivery nodes, periodically transferring the purge summaries for delivery to ones of the content delivery nodes. Additionally, the method includes, in a first content delivery node, receiving a first purge summary transferred by a second content delivery node, and comparing the first purge summary to a second purge summary maintained by the first content delivery node to identify one or more missing purge messages that have not been implemented by the first content delivery node. Once the one or more missing purge messages are identified, the method further provides, in the first content delivery node requesting purge details associated with the one or more missing purge messages from the second content delivery node and implementing the one or more missing purge messages once the purge details have been received.

In another instance, a system is provided that includes content delivery nodes and one or more purge sources to implement the method described above to purge content from the content delivery nodes.

In a further example, a computer apparatus to operate a content delivery node includes processing instructions that direct the content delivery node to receive purge messages, purge content associated with the purge messages, and compile a purge summary which indicates the purge messages that are received. The processing instructions also direct the content delivery node to periodically transfer the purge summary for delivery to other content delivery nodes. Further, the processing instructions direct the content delivery node to receive a second purge summary transferred by a second content delivery node, and compare the second purge summary to the purge summary maintained by the content delivery node to identify one or more missing purge messages that have not been implemented by the content delivery node. Responsive to identifying the one or more missing purge messages, the processing instructions also direct the content delivery node to request purge details associated with the one or more missing purge messages from the second content delivery node and implement the one or more missing purge messages once the purge details have been received. The computer apparatus further includes one or more non-transitory computer readable media that store the processing instructions.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
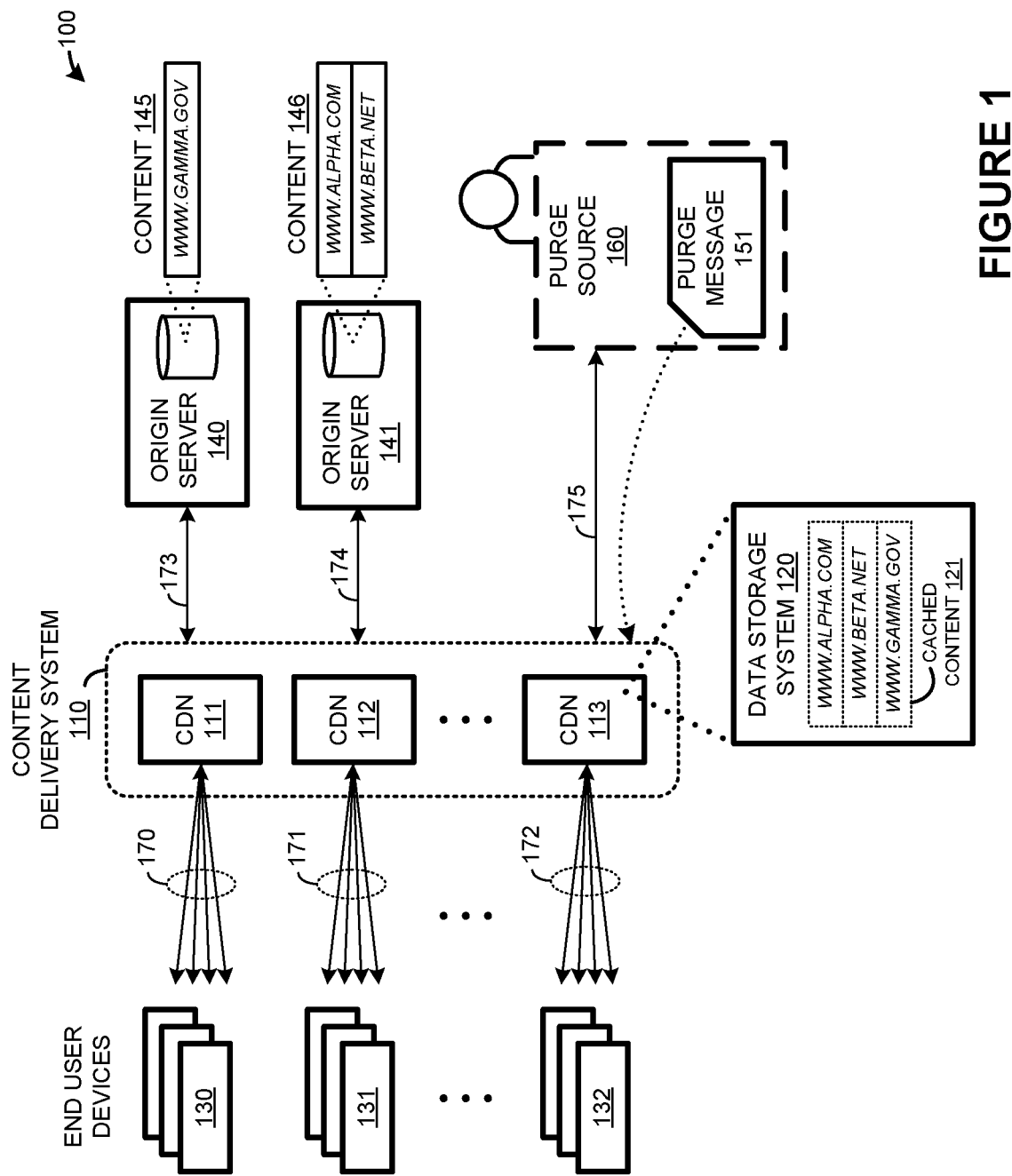
FIG. 1 illustrates a communication system for content purging.

Network content, such as web page content, typically includes content such as text, hypertext markup language (HTML) pages, pictures, video, audio, code, scripts, or other content viewable by an end user in a browser or other application. This various network content can be stored and served by origin servers and equipment. The network content includes example website content referenced in FIG. 1, such as "www.gamma.gov," "www.alpha.com," and "www-.beta.net," among others. In some examples, origin servers can serve the content to end user devices. However, when a content delivery system is employed, the content delivery system can act as a proxy to cache content delivery between origin servers and the end user devices.

Content delivery systems can add a layer of caching between origin servers of the content providers and the end users. The content delivery systems typically have one or more content delivery nodes distributed across a large geographic region to provide faster and lower latency local access to the content for the end users. When end users request content, such as a web page, a locally proximate content delivery node will respond to the content request instead of the associated origin server. Various techniques can be employed to ensure the content delivery node responds to content requests instead of the origin servers, such as associating web content of the origin servers with network addresses of the content delivery nodes instead of network addresses of the origin servers using domain name system (DNS) registration and lookup procedures.

Content management systems, content administrators, or other entities or systems may desire to delete, purge, or change content stored in content delivery nodes. These changes and purges are intended to propagate quickly and coherently throughout a content delivery system that includes many content delivery nodes. Since each content delivery node can include a separate copy of the content, these purges or other changes may not be properly propagated under certain conditions, and content delivery nodes may inadvertently include mismatched revisions of the content. In the examples discussed herein, various systems, methods, and software illustrate examples of proper coherency and propagation of the various content changes and purges in a content delivery system.

In one example, responsive to purge requests by content administrators or other processes, purge messages are transferred for delivery to a plurality of content delivery nodes within a content delivery system. Responsive to the purge messages, the content delivery nodes are configured to purge the content associated with the messages and compile purge summaries based on the purge messages received. Further, the content delivery nodes are configured to periodically transfer the compiled purge summaries to other content delivery nodes for comparison. Once the comparison purge summaries are received, each content delivery node is configured to compare the comparison purge summary with the already stored purge summary, identify missing purge messages based on the comparison, and request purge details based on the missing purge messages. In some instances, the content delivery nodes are configured to request purge details from the other content delivery node that provided comparison purge summary. These purge details may include the time of the purge, content to be purged, purge keys or tags if they are applicable in the purge, or any other detail describing the purge.

As a first example employing a content delivery system, FIG. 1 is presented. FIG. 1 is a system diagram illustrating communication system 100. Communication system 100 includes content delivery system 110, end user devices 130-132, origin servers 140-141, and purge source 160. Content delivery system 110 includes one or more content delivery nodes (CDN) 111-113. Each of CDN 111-113 can include one or more data storage systems, such as that illustrated for CDN 113 as data storage system 120. End user devices 130-132 are representative of a plurality of end user devices, which can request and receive network content, and any number of end user devices 130-132 can be associated with each of content delivery nodes 111-113. CDN 111-113 and ones of end users 130-132 communicate over associated network links 170-172. Content delivery system 110 and origin servers 140-141 communicate over associated network links 173-174. Content delivery system 110 and purge source 160 communicate over link 175. Although not shown in FIG. 1 for clarity, each of CDN 111-113 can also communicate with each other over network links.

To further illustrate FIG. 1, a brief description of the operation of communication system 100 is included. In operation, end user devices 130-132 request network content, such as content 145-146 associated with origin servers 140-141. Instead of these requests being handled by the individual origin servers 140-141, individual content delivery nodes 111-113 of content delivery system 110 receive the content requests over links 170-172 and process the content requests for delivery of the content to the associated end user devices 130-132. Requested network content that is already stored in ones of CDN 111-113 can be provided quickly to the end user devices, while network content that is not already stored in ones of CDN 111-113 can be responsively requested by an associated one of CDN 111-113 from an appropriate origin server 140-141 for delivery by the CDN and possible caching by the CDN. In this manner, each of CDN 111-113 can act as intermediary proxy nodes to provide local and fast access for end user devices 130-132 to network content of origin servers 140-141 without burdening origin servers 140-141. FIG. 1 shows cached content 121 included in data storage system 120 of CDN 113 as comprised of content 145-146, and thus content 145-146 is currently shown as cached by CDN 113. Other configurations are possible, including subsets of content 145-146 being cached in individual ones of CDN 111-113.

Although FIG. 1 shows content 145-146 of origin servers 140-141 being cached by data storage system 120, CDN 111-113 can handle other content. For example, dynamic content generated by activities of end user devices 130-132 need not originally reside on origin servers 140-141, and can be generated due to scripting or code included in web page content delivered by CDN 111-113. This dynamic content can also be cached by ones of CDN 111-113, and can be specific to a particular end user device during a communication session.

Purge source 160 handles the initiation of purge messages to purge content cached in content delivery system 110 based on purge requests. Purge source 160 may comprise an end user device, a content management system, or may reside wholly or partially as a module within origin servers 140-141. The purge messages may include automated messages by a process executed on purge source 160, may be generated in response to a purge request by a user or administrator of purge source 160, or may be generated by any other process. Once a purge message is generated, such as purge message 151, the purge message may be transferred for delivery to one or more of CDNs 111-113. Responsively, the CDNs that receive the purge message may distribute the purge message to further CDNs within the system. Although only a single purge source is illustrated in the present example, it should be understood that any number of purge sources might communicate with content delivery system 110.

Figure 2:
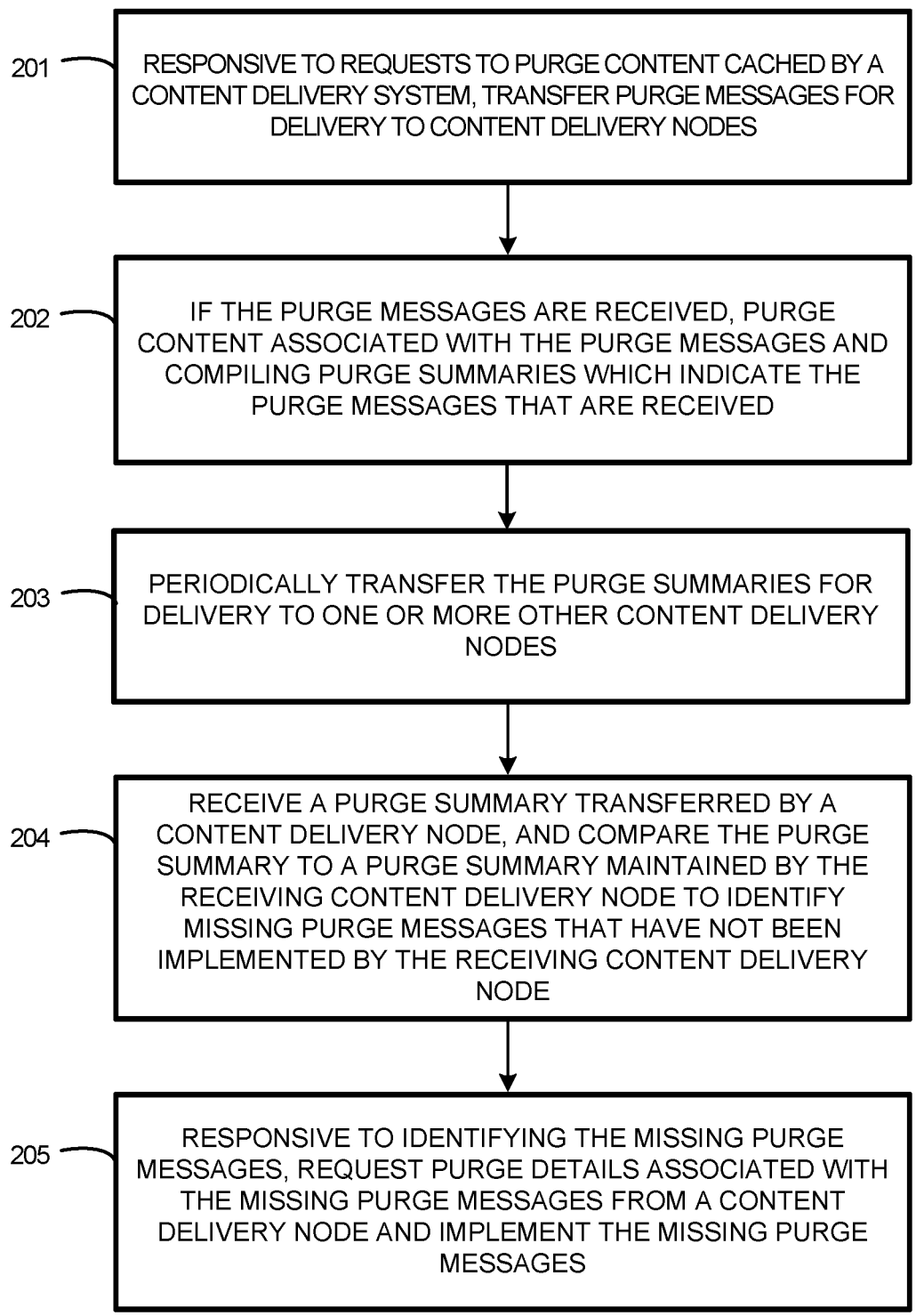
FIG. 2 illustrates an operation of a communication system to purge content from content delivery nodes.

To further illustrate the operation of communication system 100, FIG. 2 is included. FIG. 2 is a flow diagram illustrating an operation to purge content from a content delivery system. The operations of FIG. 2 are referenced parenthetically in the description below.

In operation, a purge source is configured to, responsive to requests to purge content cached by the content delivery system, transfer (201) purge messages for delivery to content delivery nodes in the content delivery system. For instance, referring to FIG. 1, purge source 160 may receive input from an administrator or automated process to purge content from CDNs 111-113. In response, purge source 160 will transfer a purge request for delivery to CDNs 111-113 to purge the identified content.

Once transferred, the content delivery nodes are configured to, if the purge messages are received, purge (202) the content associated with the messages and compile purge summaries that indicate the purge messages are received. In some examples, the purge summaries may comprise one or more numerical ranges based on the messages received. For instance, a first purge message may include a numerical identifier of one, whereas the hundredth purge message may possess a numerical identifier of one hundred. Accordingly, each content delivery node may maintain a purge summary that comprises ranges of numerical identifiers corresponding to the received messages, which in the previous example would be a range of one to one hundred.

Once the purge summaries are compiled, the content delivery nodes are configured to periodically transfer (203) the purge summaries for delivery to one or more of the other content delivery nodes. This periodic transfer may occur based on period of time, such as every minute, may occur based on a certain number of received purge messages, such as every one hundred messages, or may occur at any other interval. In some examples, the periodic transfer of purge summaries may be random or directed to any of the content delivery nodes in the content delivery system. In other instances, the periodic transfers may be based on proximity settings for the content delivery nodes, which may allow content delivery nodes that are closer in proximity to exchange purge summaries more frequently than content delivery nodes that are separated by large distances.

Responsive to receiving a purge summary, a content delivery node is configured to compare (204) the purge summary received with the purge summary maintained by the content delivery node and identify one or more missing purge messages that have not been implemented. Once the one or more missing purge messages have been identified by the content delivery node, the content delivery node is configured to request (205) purge details associated with the missing messages from the content delivery node that transferred the comparison purge summary and implement the one or more missing messages once the purge details have been received. These purge details may include the time of the purge, content to be purged, purge keys or tags if they are applicable in the purge, or any other detail describing the purge.

Figure 3:
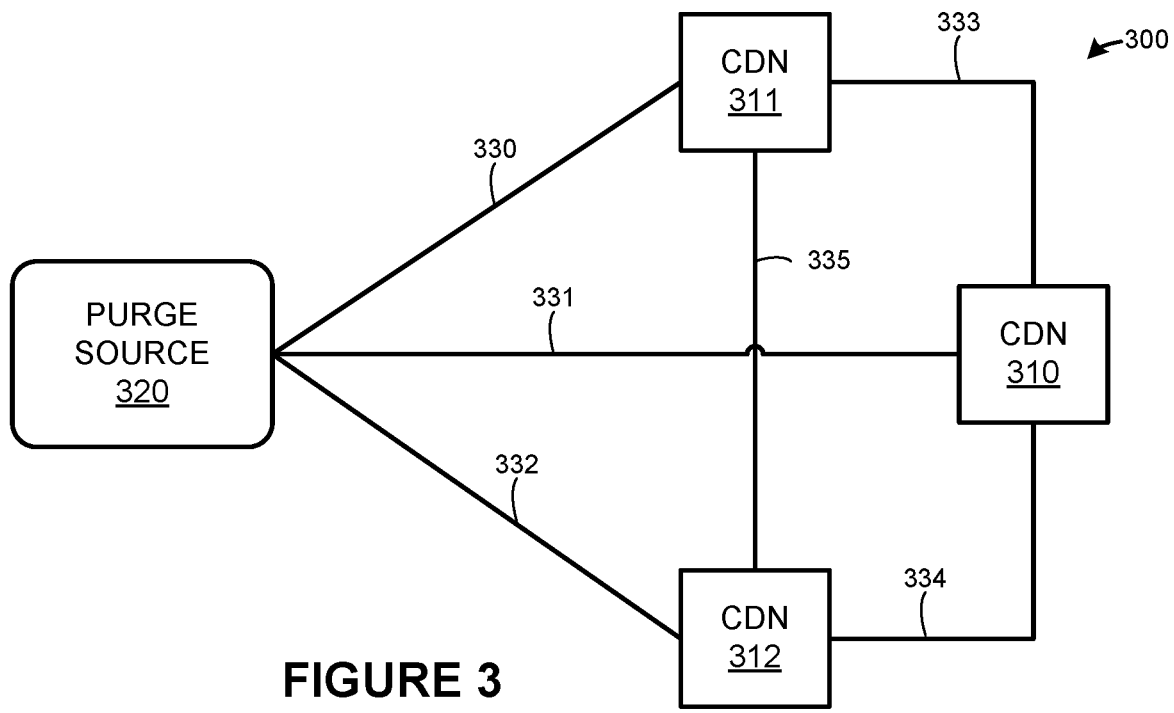
FIG. 3 illustrates a system to provide content purging to content delivery nodes.

To further illustrate implementing content purges, FIG. 3 is included. FIG. 3 illustrates a system 300 for implementing content purges in a content delivery system. System 300 includes content delivery nodes (CDNs) 310-312 as a part of a content delivery system, and purge source 320. CDNs 310-312 and purge source 320 communicate over communication links 330-335.

CDNs 310-312 and purge source 320 can each include communication interfaces, network interfaces, processing systems, computer systems, microprocessors, storage systems, storage media, or some other processing devices or software systems, and can be distributed among multiple devices. Examples of CDNs 310-312 and purge source 320 can each include software such as an operating system, logs, databases, utilities, drivers, caching software, networking software, and other software stored on a computer-readable medium. Instances of purge source 320 may comprise an end user device, such as a computer or smartphone, a content management system, an origin server, or some other device. Although a single purge source is included in FIG. 3, it should be understood that any number of purge sources might communicate with content delivery nodes in the content delivery system.

Communication links 330-335 each use metal, glass, optical, air, space, or some other material as the transport media. Communication links 330-335 can each use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication links 330-335 can each be a direct link or can include intermediate networks, systems, or devices, and can include a logical network link transported over multiple physical links. Although one main link for each of links 330-335 is shown in FIG. 3, it should be understood that links 330-335 are merely illustrative to show communication modes or access pathways. In other examples, further links can be shown, with portions of the further links shared and used for different communication sessions or different content types, among other configurations. Communication links 330-335 can each include many different signals sharing the same associated link, as represented by the associated lines in FIG. 3, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

In operation, purge source 320 is configured to identify requests to purge content from CDNs 311-313 and transfer purge messages for delivery to the content delivery nodes. CDNs 310-312 are configured to receive the purge messages and purge the content associated with the request. CDNs 310-312 are further configured to maintain purge summaries that can be passed from one content delivery node to another to verify that all content delivery nodes implement the purge messages.

Figure 4:
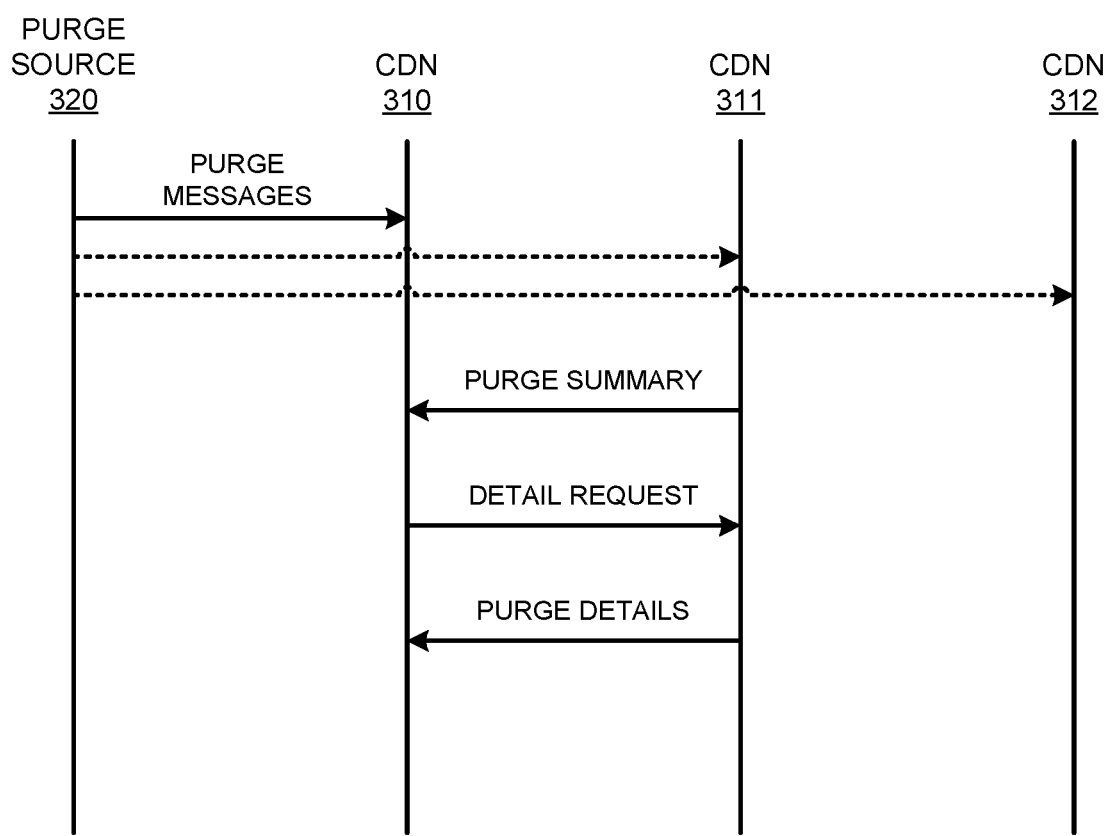
FIG. 4 illustrates a timing diagram for purging content from content delivery nodes.

To further illustrate the operation of system 300, FIG. 4 is included that demonstrates a timing diagram for purging content from content delivery nodes. As illustrated, purge source 320 transfers purge messages for delivery to content delivery nodes 310-312 in a content delivery system. This transfer may be direct in some examples, or may be transferred to one or more content delivery nodes that can then disperse the purge messages to the other nodes of the system. If the content delivery nodes receive the messages, the appropriate content associated with the messages is purged, and a purge summary is compiled based on the messages received. In some examples, the purge summary may comprise one or more ranges of numbers that correspond to the purge messages. For instance, the first message transferred by purge source 320 may be identified as number one, and the hundredth message transferred by purge source 320 may be designated one hundred. Accordingly, if all of the messages were received by one of CDNs 310-312, the purge summary may simply include a range of one to one hundred. However, if a message were not received by one of CDNs 310-312, the ranges may reflect the missing message. For example, if CDN 310 missed message fifty-one, then the ranges in the purge summary would comprise one through fifty and fifty-two through one hundred.

Once the purge summaries are generated and maintained, the content delivery nodes may periodically transfer the purge summaries to other content delivery nodes. In the present example, CDN 311 transfers a purge summary to CDN 310. In response to receiving the purge summary, CDN 310 is configured to compare the purge summary from CDN 311 with the maintained purge summary on CDN 310, and identify one or more missing purge messages from this comparison. Referring again to the numbered ranges as purge summaries, if CDN 311 passes a purge summary that includes a range of messages from one to one hundred, and CDN 310 contains ranges of messages from one to fifty and fifty-two to one hundred, then CDN 310 should identify that it is missing message number fifty-one.

In response to identifying the missing purge messages, CDN 310 is configured to request purge details associated with missing purge messages from CDN 311 and implement the missing purge messages once the details have been received. These purge details may include the time of the purge, content to be purged, purge keys or tags if they are applicable in the purge, or any other detail describing the purge. Referring to the range example above, CDN 310 may be configured to request purge details for message fifty-one from CDN 311, and implement message fifty-one upon receipt from CDN 311. Once implemented, the purge summary for CDN 310 may be updated to reflect that the information in purge message fifty-one has been received.

Although FIG. 3 illustrates an example with three content delivery nodes within a content delivery system, it should be understood that any number of content delivery nodes might be implemented within a content delivery system.

Figures 5, 6:
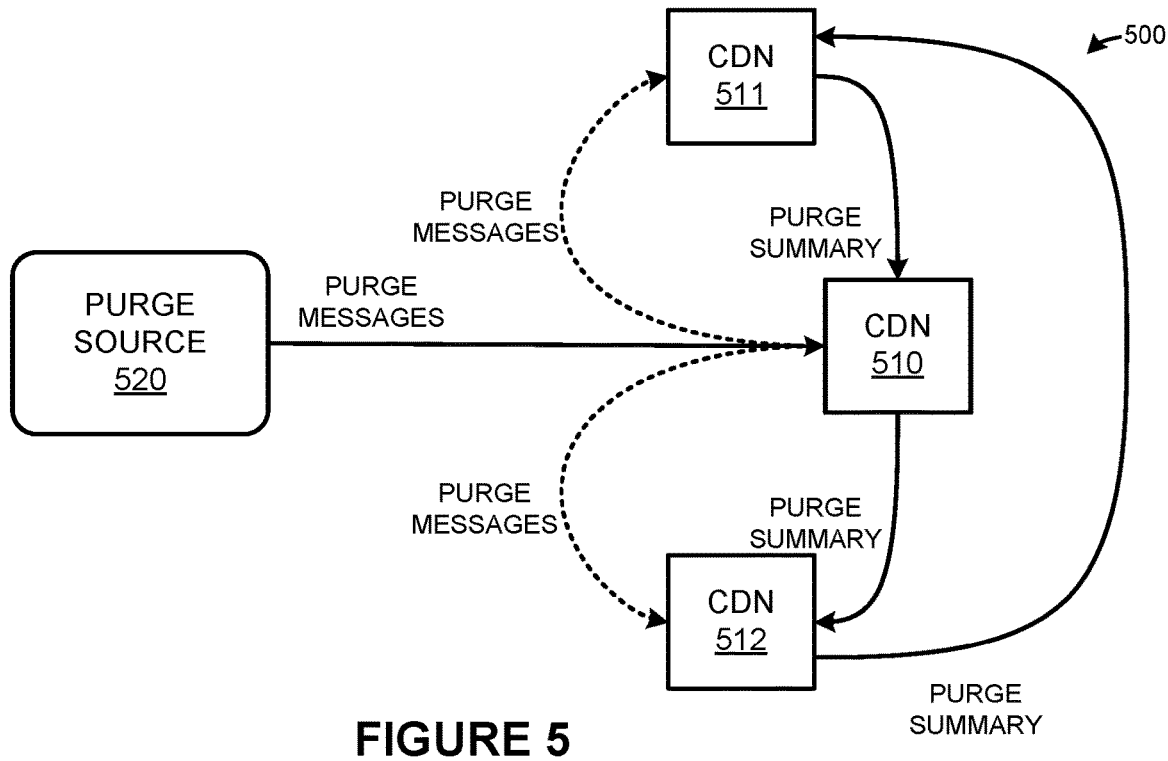
FIG. 5 illustrates a diagram for purging content from content delivery nodes.
FIG. 6 illustrates purge summaries for verifying purge messages.

Turning to FIG. 5, FIG. 5 illustrates a block diagram 500 for implementing content purges in a content delivery system. Block diagram 500 includes content delivery nodes (CDNs) 510-512 and purge source 520. In operation, CDNs 510-512 are configured to cache content from various origin servers to be provided to various end user devices. Such content may include text, web pages, pictures, movies, and other types of similar content. Once the content is cached, an administrator or some other mechanism may request to purge cached content that is stored on the content delivery nodes. In response to this request, purge source 520, which may be a user device in some examples, is configured to transfer purge messages for delivery to CDNs 510-512, directing the content delivery nodes to purge the requested content. As illustrated in the present example, purge source 520 transfers purge messages to a single content delivery node, CDN 510. In response to receiving the messages, CDN 510 then initiates the dispersion of the purge messages to other CDNs in the content delivery system. This dispersion may include dispersing the messages to every node in the content delivery system, sending the messages over a spanning tree, or using Internet protocol multicast to provide the messages to other content delivery nodes.

If a content delivery node receives the messages, the content delivery node is configured to purge the content and compile purge summaries based on the purge messages received. Further, as illustrated in block diagram 500, CDNs 510-512 are configured to periodically transfer purge summaries to other content delivery nodes for comparison purposes. For example, CDN 511 transfers a purge summary to CDN 510. In response to the purge summary, CDN 510 compares the purge summary from CDN 511 with the purge summary maintained on CDN 510 to identify missing purge messages. If missing purge messages are identified, CDN 510 may request the missing purge details from CDN 511 so that they may be implemented in CDN 510.

FIG. 6 illustrates purge summaries for verifying purge messages according to one example. FIG. 6 includes purge summary tables 600 and 601, which further include purge summaries 610-611, and purge details 620-621. In operation, content delivery nodes, such as CDNs 111-113 are configured to cache content between origin servers and end user devices. Once the content is cached, an administrator or some other management mechanism may desire to purge or remove content from these delivery nodes. To accomplish this task, purge messages are transferred to the content delivery nodes, requesting the nodes to purge specific content. Once received, the content delivery nodes purge the content and develop purge summaries. These purge summaries may be implemented in a table similar to purge summary table 600-601, or may be implemented in any other data structure that ties purge details to purge summaries.

In the present instance, purge summary tables 600-601 include purge summaries 610-611 and purge details 620-621. When a purge message is received, the message is stored as a numerical identifier along with the specific purge instruction or detail. Accordingly, when the content delivery node is configured to transfer the purge summary, the node is only required to transfer the numerical range or ranges of purge messages received. For instance, purge summary table 600 includes a purge summary 610 of 1-n, whereas purge summary table 601 includes a purge summary of 1 and 3-n. As a result, if purge summary table 600 were transferred to another content delivery node that compiled purge summary table 601, the content delivery node with purge summary table 601 would identify that it was missing purge message number two. In response to the identification, the content delivery node with purge summary table 601 may retrieve purge details from the content delivery node responsible for purge summary table 600. These purge details may include the information necessary to implement the purge specified by missing purge message, such as the time of the purge, content to be purged, or any other similar information.

Although illustrated with tables and ranges in the current example, it should be understood that the purge summaries might take the form of any other data structure capable of being transferred between content delivery nodes. These include, but are not limited to, trees, lists, or any other similar data structure.

Figure 7:
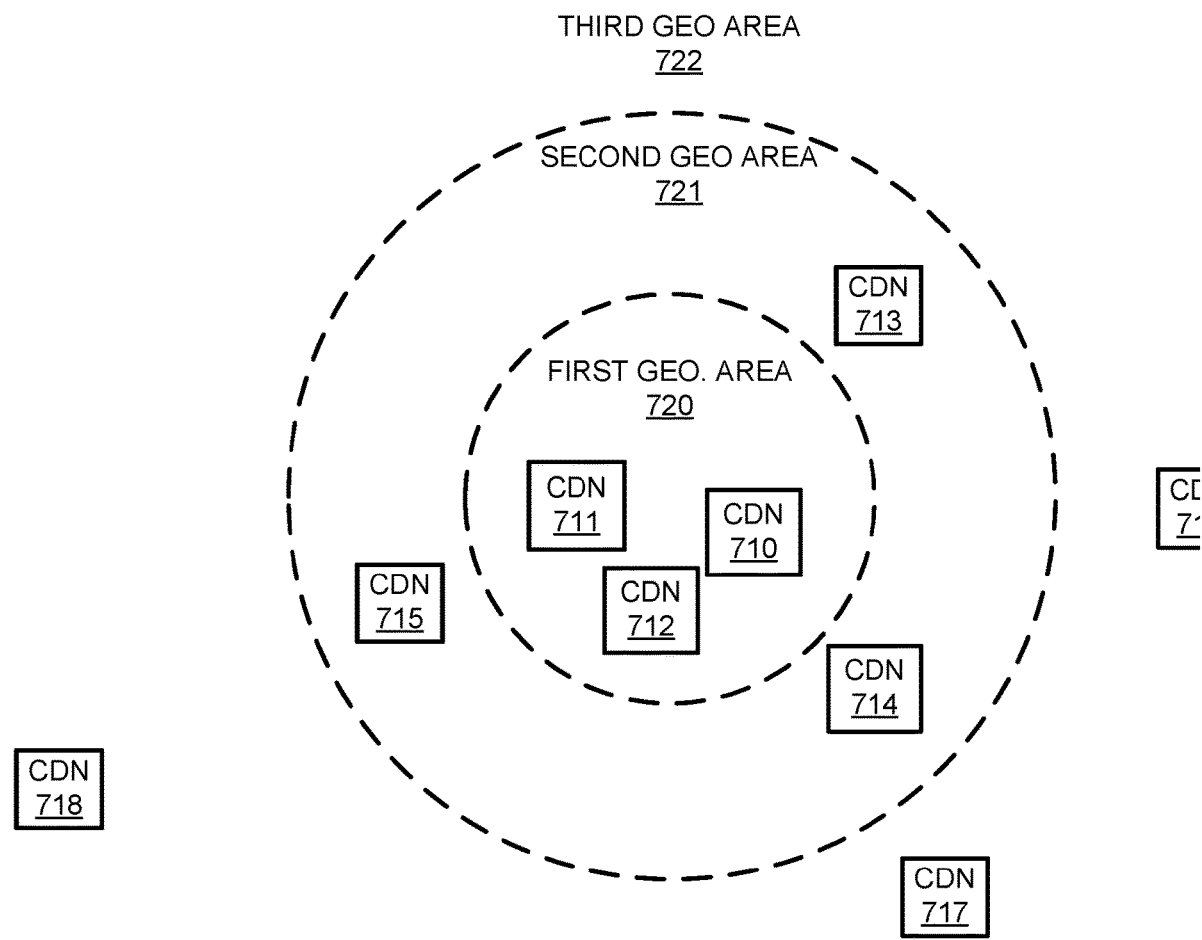
FIG. 7 illustrates an overview of transferring purge summaries amongst content delivery nodes based on node proximity settings.

FIG. 7 illustrates an overview of transferring purge summaries among content delivery nodes based on node proximity settings. FIG. 7 includes content delivery nodes 710-718, and geographic areas 720-722. In operation, CDNs 710-718 are configured to receive purge messages indicating content to be purged from storage on the delivery nodes. Further, CDNs 710-718 are configured compile purge summaries based on the purge messages received and periodically transfer these summaries to other content delivery nodes. In some instances, the periodic transfer of summaries may be random or to any other content delivery node in the system. For example, CDN 710 could randomly select any of CDN 711-718 to transfer a compiled purge summary.

In contrast to randomly selecting any content delivery node for transfer of the compiled purge summary, the present example provides three geographic area groupings for the content delivery nodes to provide organization in the selection of a summary transfer destination. As illustrated in first geographic area 720, CDNs 710-712 may choose one another as a purge summary destination at a greater rate than CDNs 713-718. By choosing one another, latency may be avoided as the content delivery nodes are in closer proximity to one another. Further, CDNs 710-712 may select CDNs 713-715 at a greater rate than CDNs 716-718 to avoid latency in implementing a purge message. For example, referring to CDN 710, CDN 710 may select one of CDNs 711-712 to transfer purge summaries every minute, may select one of CDNs 713-715 to transfer purge summaries every five minutes, and may select one of CDNs 716-718 to transfer purge summaries every ten minutes. By layering the selection of content delivery nodes for the transfer of purge summaries, a content delivery node may more quickly rectify issues with missing purge messages.

Figure 8:
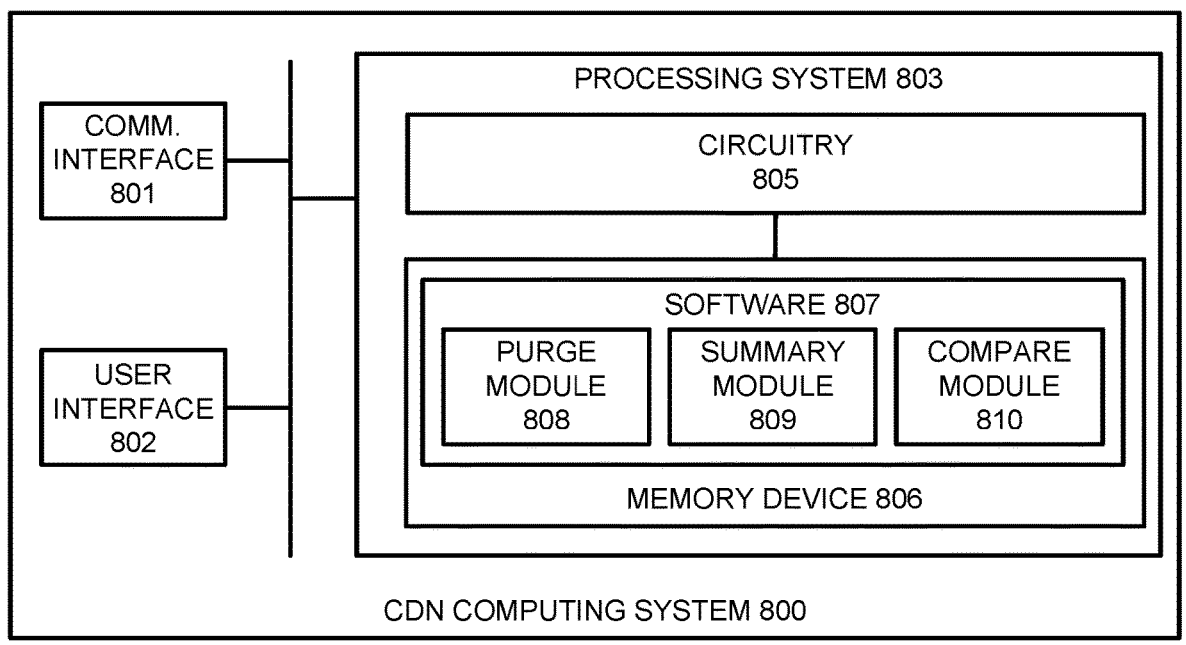
FIG. 8 illustrates a content delivery node computing system for implementing content purges.

Turning now to FIG. 8, FIG. 8 illustrates a content delivery node (CDN) computing system 800 for processing purge messages and purge summaries. CDN computing system 800 is an example of CDNs 111-113 and 311-312, although other examples may exist. CDN computing system 800 comprises communication interface 801, user interface 802, and processing system 803. Processing system 803 is linked to communication interface 801 and user interface 802. Processing system 803 includes processing circuitry 805 and memory device 806 that stores operating software 807.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use TDM, IP, Ethernet, optical networking, wireless protocols, communication signaling, or some other communication format—including combinations thereof.

User interface 802 comprises components that interact with a user. User interface 802 may include a keyboard, display screen, mouse, touch pad, or some other user input/output apparatus. User interface 802 may be omitted in some examples.

Processing circuitry 805 comprises microprocessor and other circuitry that retrieves and executes operating software 807 from memory device 806. Memory device 806 comprises a non-transitory storage medium, such as a disk drive, flash drive, data storage circuitry, or some other memory apparatus. Operating software 807 comprises computer programs, firmware, or some other form of machine-readable processing instructions. Operating software 807 includes purge module 808, summary module 809, and compare module 810. Operating software 807 may further include an operating system, utilities, drivers, network interfaces, applications, or some other type of software. When executed by circuitry 805, operating software 807 directs processing system 803 to operate CDN computing system 800 as described herein.

In one example, computing system 800 is configured to receive purge messages that direct computing system 800 to purge specific content cached from one or more origin servers. Responsive to these messages, purge module 808 purges the content associated with the message and summary module 809 compiles a purge summary based on the messages. In some examples, the purge messages may include a numerical identifier allowing computing system 800 to generate a range or ranges of values that correspond to the received purge messages. For example, a first purge message may arrive as number one, but the hundredth message may arrive as number one hundred. Accordingly, the purge summary may comprise a range indicating that messages one through one hundred have been received.

Summary module 809 further directs CDN computing system 800 to periodically transfer the compiled purge summary to other content delivery nodes using communication interface 801. If the other content delivery nodes identify that they are missing one or more purge messages, the other content delivery nodes may request purge details from computing system 800. These purge details will allow the other content delivery nodes to implement the missing messages.

In addition to transferring purge summaries to other delivery nodes, computing system 800 is also configured to receive purge summaries from the other content delivery nodes using communication interface 801. In one example, a second content delivery node will transfer a purge summary to computing system 800. In response to this summary, compare module 810 will compare the received purge summary with the purge summary compiled and maintained by computing system 800. Using this comparison, computing system 800 is configured to identify one or more missing purge messages that have not been received by computing system 800, and request purge details from the second content delivery node corresponding to the missing purge messages. Once the purge details are received from the second content delivery node, computing system 800 implements the missing purge using purge module 808 and may further update the stored purge summary for computing system 800 reflecting the purge provided by the second content delivery node.

Although illustrated in the present example with three software modules, it should be understood that CDN computing system 800 might include any number of software modules to carry out the purging processes described herein.

Referring back to FIG. 1, CDN 111-113, origin servers 140-141, and purge source 160 can each include communication interfaces, network interfaces, processing systems, computer systems, microprocessors, storage systems, storage media, or some other processing devices or software systems, and can be distributed among multiple devices. Examples of CDN 111-113, origin servers 140-141, and purge source 160 can each include software such as an operating system, logs, databases, utilities, drivers, caching software, networking software, and other software stored on a computer-readable medium. Content delivery system 110, in addition to including CDN 111-113, can include equipment and links to route communications between CDN 111-113 and any of end user devices 130-132, origin servers 140-141, and purge source 160, among other operations.

End user devices 130-132 can each be a user device, subscriber equipment, customer equipment, access terminal, smartphone, personal digital assistant (PDA), computer, tablet computing device, e-book, Internet appliance, media player, game console, or some other user communication apparatus, including combinations thereof.

Communication links 170-175 each use metal, glass, optical, air, space, or some other material as the transport media. Communication links 170-175 can each use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication links 170-175 can each be a direct link or can include intermediate networks, systems, or devices, and can include a logical network link transported over multiple physical links. Although one main link for each of links 170-175 is shown in FIG. 1, it should be understood that links 170-175 are merely illustrative to show communication modes or access pathways. In other examples, further links can be shown, with portions of the further links shared and used for different communication sessions or different content types, among other configurations. Communication links 170-175 can each include many different signals sharing the same associated link, as represented by the associated lines in FIG. 1, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a cache node in a content delivery network, the method comprising:
    in the cache node, receiving purge instructions comprising requests to purge content cached by cache node and a first numerical range;
    in the cache node, purging the content and generating a purge summary indicative of the content that was purged and comprising the first numerical range;
    in the cache node, sending the purge summary to at least one other cache node in the content delivery network;
    in the cache node, receiving other purge summaries comprising other numerical ranges from other cache nodes and comparing the other purge summaries to the purge summary to identify one or more purge instructions not yet implemented by the cache node; and
    in the cache node, responsive to identifying the one or more purge instructions, requesting purge details associated with the one or more missing purge instructions from one or more of the other cache nodes and implementing the one or more purge instructions once the purge details have been received.

2. The method of claim 1 wherein comparing the purge summary to the other purge summaries comprises identifying one or more numerical values present in one or more of the other purge summaries that are not present in the purge summary.

3. The method of claim 1 further comprising:
    in the cache node and responsive to implementing the one or more purge instructions, updating the purge summary.

4. A cache node comprising:
    one or more computer readable storage media;
    one or more processors operatively coupled with the one or more computer readable storage media; and
    program instructions stored on the one or more computer readable storage media that, when executed by the one or more processors, direct the cache node to at least:
    receive purge instructions comprising one or more numerical ranges and requests to purge content;
    purge the content and generate a purge summary indicative of the content that was purged and comprising a first one or more numerical ranges;
    send the purge summary to at least one other cache node;
    receive other purge summaries, comprising other numerical ranges from other cache nodes, and compare the other purge summaries to the purge summary to identify one or more purge instructions not yet implemented by the cache node; and
    responsive to identifying the one or more purge instructions, request purge details associated with the one or more missing purge instructions from one or more of the other cache nodes and implement the one or more purge instructions once the purge details have been received.

5. The cache node of claim 4 wherein, to compare the purge summary to the other purge summaries, the cache node identifies one or more numerical values present in the other purge summaries that are not present in the purge summary.

6. The cache node of claim 4 wherein the program instructions further direct the cache node to update the purge summary upon implementing the one or more purge instructions.

7. The method of claim 1 wherein the purge details comprise the content to be purged.

8. The method of claim 1 wherein the purge details comprise a time of the purge.

9. The method of claim 1 wherein the purge details comprise a purge key or tag.

10. The cache node of claim 4 wherein the purge details comprise the content to be purged.

11. The cache node of claim 4 wherein the purge details comprise a time of the purge.

12. The cache node of claim 4 wherein the purge details comprise a purge key or tag.

* * * * *